United States Patent
Deuel et al.

(10) Patent No.: US 8,768,312 B2
(45) Date of Patent: Jul. 1, 2014

(54) ASYNCHRONOUS ACTIVATION OF WIRELESS DEVICES WITHIN A REAL TIME BILLING INFRASTRUCTURE

(75) Inventors: Kristen Renee Deuel, Salt Lake City, UT (US); Timothy Wayne Parker, Roeland Park, KS (US); Zach Mabe, Canton, GA (US); Richard Joseph Von Scherr, Atlanta, GA (US); Eric John Kingston, St. Charles, IL (US)

(73) Assignee: Cox Communications, Inc., Atlanta, GA (US)

( * ) Notice: Subject to any disclaimer, the term of this patent is extended or adjusted under 35 U.S.C. 154(b) by 672 days.

(21) Appl. No.: 12/823,461

(22) Filed: Jun. 25, 2010
(Under 37 CFR 1.47)

(65) Prior Publication Data
US 2011/0151843 A1  Jun. 23, 2011

Related U.S. Application Data

(60) Provisional application No. 61/220,928, filed on Jun. 26, 2009.

(51) Int. Cl.
*H04M 3/42* (2006.01)

(52) U.S. Cl.
USPC ............ 455/414.1; 455/419; 455/432.3; 370/352; 705/26.1

(58) Field of Classification Search
USPC ........... 455/405–409, 414.1, 432.3, 419, 411, 455/433, 414.4, 522.1; 370/352; 709/203, 709/228; 707/E17.121; 705/26.1
See application file for complete search history.

(56) References Cited

U.S. PATENT DOCUMENTS

| | | | |
|---|---|---|---|
| 6,181,785 B1 * | 1/2001 | Adams et al. | 379/114.01 |
| 7,280,818 B2 * | 10/2007 | Clayton | 455/407 |
| 2002/0199182 A1 * | 12/2002 | Whitehead | 725/1 |
| 2003/0028482 A1 * | 2/2003 | Burak et al. | 705/40 |
| 2004/0185825 A1 * | 9/2004 | Preiss et al. | 455/405 |
| 2007/0213030 A1 * | 9/2007 | Benco et al. | 455/405 |

* cited by examiner

*Primary Examiner* — Mahendra Patel
(74) *Attorney, Agent, or Firm* — Merchant & Gould

(57) ABSTRACT

Services associated with an order for a wireless device of a wireless subscriber are decomposed into core services and non-core services. Separate provisioning jobs are provided for asynchronously provisioning the core services and the non-core services. Upon successful completion of the provisioning of the core services and without regard to completion of the provisioning of the non-core services, an account for the subscriber is established in a billing system to allow immediate use of the core services by the wireless subscriber and immediate billing for usage of the core services by the wireless subscriber.

20 Claims, 14 Drawing Sheets

ASYNCHRONOUS ACTIVATION OF WIRELESS DEVICES WITHIN A REAL TIME BILLING INFRASTRUCTURE

RELATED APPLICATIONS

This application claims the benefit of U.S. Provisional Application No. 61/220,928, filed Jun. 26, 2009, which is incorporated herein by reference.

FIELD OF THE INVENTION

This disclosure relates in general to activation of wireless devices, and more particularly to asynchronous activation of core and non-core services for wireless devices.

BACKGROUND

Wireless service fees have decreased significantly because of competition among wireless providers. This has resulted in wireless phones becoming ubiquitous and basic service becoming a commodity. As service fees bottom out, wireless service providers distinguish their offerings through means other than rates, such as by offering supplementary features as options.

In addition, wireless carriers today are faced with creating more efficient distribution channels, increasing customer satisfaction, while also improving margin and profitability. Industry trends are pushing the sale of handsets further into the retail channel. Phone activation is regarded as a critical process in today's severely competitive telecom industry. Subscribers prefer a speedy, hassle-free set-up process. Thus, companies need to ensure that newly ported numbers are activated at the earliest while order fallouts and delays are kept at a minimum.

Provisioning is currently accomplished using a traditional water flow process, wherein the order is taken and the services/device is provisioned. The cost and effort of provisioning handsets, activating users, and updating handset parameters can be greatly reduced by using over-the-air activation mechanisms. Over the Air Service Provisioning (OTASP) allows a potential wireless service subscriber to activate new wireless services, and allows an existing wireless subscriber to make services changes without the intervention of a third party. To set up service, a new subscriber provides the intended service provider sufficient information (e.g., name, address, etc.) to prove credit-worthiness and establish a record within the billing system of the service provider. In addition, the ESN of the mobile station needs to be given to the provider.

Once the provisioning is successful, a record is set up in billing and then the customer is ready to use the device. Minutes and service usage are tracked and this information is later entered into the billing system once the account is set up therein. In this process, there is no inter-dependency between activation and billing because the user is not billed until the wireless device and all services have been provisioned.

More companies are transitioning to a real-time billing system. In a real-time billing system, a rating engine supports multiple flexible rating options, so service providers can customize rates and promotional packages to meet subscriber needs. However, with a real time billing system, the user cannot make calls until the device has been enabled in the real-time billing system. The success of a new customer's wireless service activation including voice, data, messaging and content is directly dependent upon all service activation requests to complete successfully prior to the customer being active with the ability to use their services. Thus, until the subscriber is fully provisioned and set up in the billing system, customers may experience a delay in the ability to make phone calls, send text or multi-media messages, download ring tones, etc., in the length of time required to provision all voice, data, messaging and content services. When billing is not set up at the same time or before provisioning, then the network will allow the subscriber onto the network. However, when the network queries billing to see if the subscriber is authorized to perform the action the subscriber is attempting, the billing may deny this action to the subscriber. When billing is set up first, a subscriber is being billed before the subscriber actually has the ability to use the service.

Further, the ability for wireless providers to rate new customers on a real-time basis is not available until all requested services have successfully completed. Nevertheless, errors in a provisioning activation system should not be allowed to delay the setup of a user into the billing system. Thus, activation of wireless devices within a real time billing infrastructure presents a challenge.

SUMMARY OF THE INVENTION

To overcome the limitations described above, and to overcome other limitations that will become apparent upon reading and understanding the present specification, embodiments for in-network online storage with increased session bandwidth are disclosed.

The above-described problems are solved by dividing services associated with a wireless device of wireless subscriber into core and non-core services. The core services may be activated without the need to successfully provision any of the non-core services.

An embodiment includes a method for asynchronously activating wireless services for a subscriber of a wireless device. The method includes decomposing services associated with an order for a wireless device of a wireless subscriber into core services and non-core services, providing separate provisioning jobs for asynchronously provisioning the core services and the non-core services and, upon successful completion of the provisioning of the core services and without regard to completion of the provisioning of the non-core services, establishing an account for the subscriber in a billing system to allow immediate use of the core services by the wireless subscriber and immediate billing for usage of the core services by the wireless subscriber.

In another embodiment, a system for asynchronously activating wireless services for a subscriber of a wireless device is provided. The system includes memory for storing data including a product catalog identifying services for wireless devices and a processor, coupled to the memory, the processor configured to decompose services associated with an order for a wireless device of a wireless subscriber into core services and non-core services, to generate separate provisioning jobs for asynchronously provisioning the core services and the non-core services and, upon successful completion of the provisioning of the core services and without regard to completion of the provisioning of the non-core services, to establish an account for the subscriber in a billing system to allow immediate use of the core services by the wireless subscriber and immediate billing for usage of the core services by the wireless subscriber.

A computer readable medium including executable instructions which, when executed by a processor, provides asynchronously activation of wireless services for a subscriber of a wireless device, by decomposing services associated with an order for a wireless device of a wireless subscriber into core services and non-core services, providing separate provisioning jobs for asynchronously provisioning the core services and the non-core services and, upon successful completion of the provisioning of the core services and without regard to completion of the provisioning of the non-core services, establishing an account for the subscriber in a billing system to allow immediate use of the core services by the wireless subscriber and immediate billing for usage of the core services by the wireless subscriber.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to asynchronous activation of wireless devices within a real time billing infrastructure.

Figure 1:
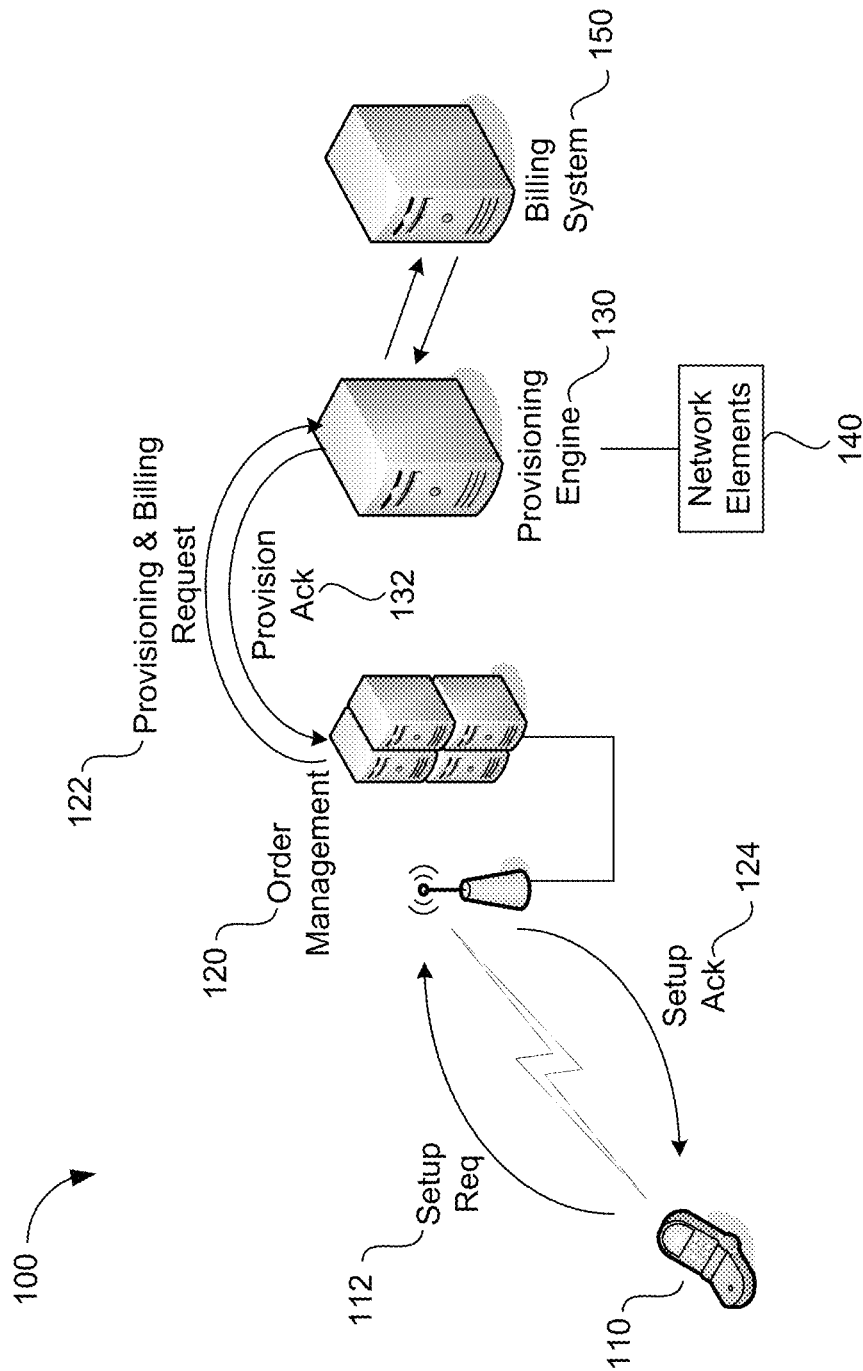
FIG. 1 illustrates a conventional system for provisioning a wireless device.

FIG. 1 illustrates a conventional system 100 for provisioning a wireless device. A subscriber 110 may have a new wireless device or may want to add a service to an existing wireless device. The wireless device communicates with an order management system 120 by sending a setup request 112 to provide data to the service provider. The order management system 120 sends a provisioning and billing request 122 to a provisioning engine 130 identifying the subscriber 110 and the network elements 140 that need to be set up according to the contract. For example, the subscriber 110 may provide an electronic serial number (ESN) so that an order associated with the subscriber 110 may be decomposed, and network setup tasks may be sent to provisioning 130 (e.g., to a provisioning engine that updates network elements). Upon a successful completion of the provisioning of the network elements 140, billing for the subscriber 110 is set up by creating the billing records in the billing system 150. Thereafter, a provision acknowledgement 132 is sent to the order management system 120. A setup acknowledgement 124 is sent to the subscriber 110.

After being provisioned, the subscriber's wireless device contacts the network. In a real time billing system 150, real time reads of the billing system 150 are made when the wireless device of the subscriber 110 contacts the network to see how much time the subscriber 110 has left on the account. A problem in the conventional system is that if any part of the provisioning fails, the subscriber 110 may not be set up in the billing system 150, and the subscriber cannot use the wireless device. On the business side, the concern is that the provisioning is not completed because of some minor issue. However, the subscriber 110 may have been provisioned sufficiently to be billable. That is, the service provider could be making money on the subscriber's voice calling, but the conventional system halts the process even if only the voicemail failed to provision properly (i.e., a minor issue—not a core issue).

Figure 2:
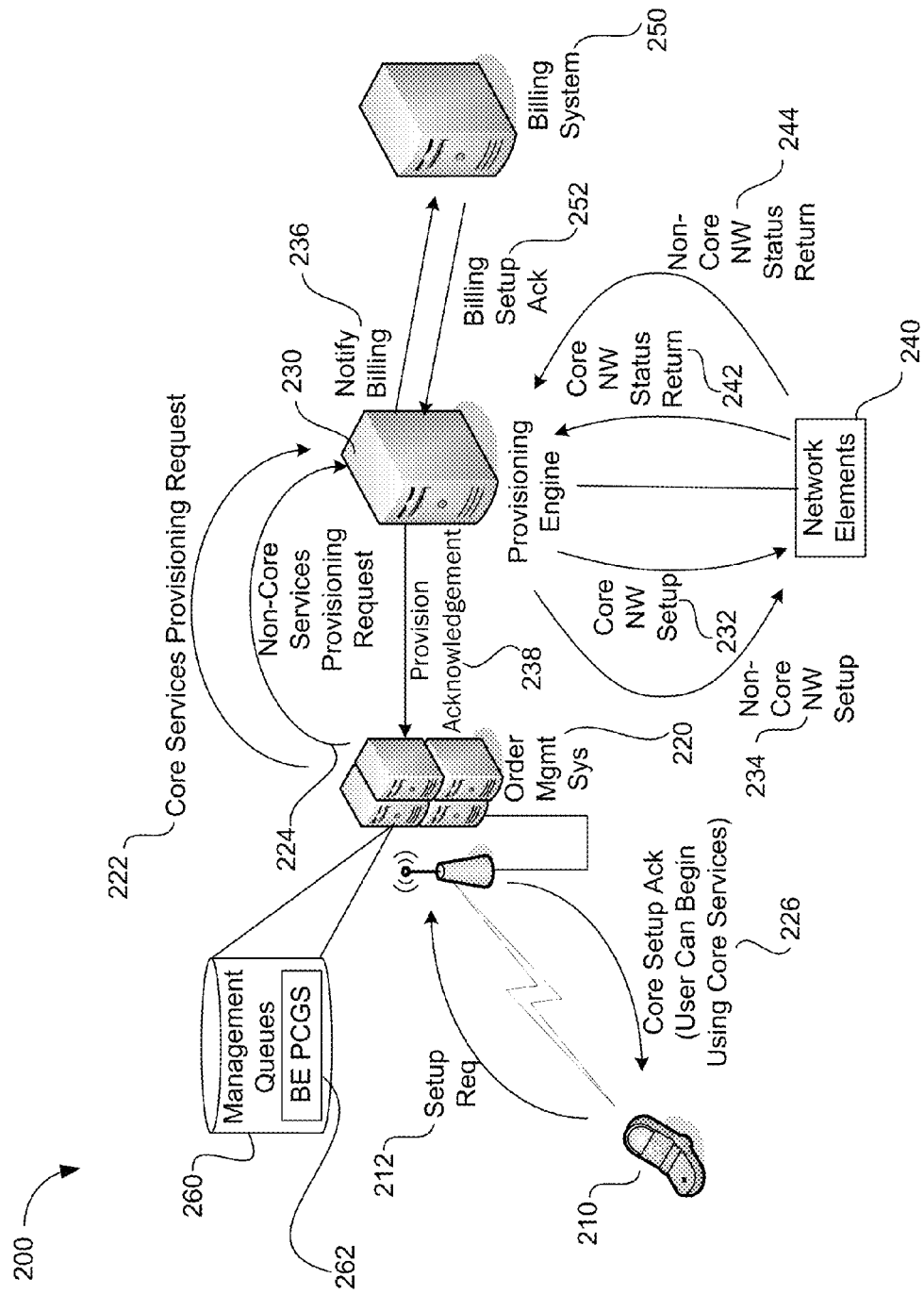
FIG. 2 illustrates a system for providing order management between point of capture and the provisioning infrastructure systems according to an embodiment of the invention.

FIG. 2 illustrates a system 200 for providing order management between point of capture and the provisioning infrastructure systems according to an embodiment of the invention. In FIG. 2, the system 200 provides linear provisioning by prioritizing services defined by the provider, wherein the provisioning of a first set of services may complete without the reliance on the success of a remaining set of services.

Again, a subscriber 210 may have a new wireless device or may want to add a service to an existing wireless device. The wireless device communicates with an order management system 220 by sending a setup request 212 to provide data to the service provider. The order management system 220 decomposes an order. The services to be provisioned may be divided into a plurality of service groups. For example, the services to be provisioned may be divided into core (prioritized) services and non-core services. This allows core services and non-core services to be functionally unbundled as far as provisioning is concerned. Core services are services that provide sufficient functionality for fundamental phone usage. During the course of the decomposition in the order management, the system will make a determination as to what may be core or not core, and generate multiple provisioning requests or multiple provisioning jobs as opposed to just one.

In FIG. 2, two provisioning requests (i.e., one for core services 222 and one for non-core services 224) are sent to the provisioning engine 230. This allows the provisioning engine 230 to provision the core services first. The provisioning engine 230 sends a core network setup message 232 to the network elements 240. Once the core services provided by the network elements 240 are provisioned, the order is considered complete and a core network status return message 242 is provided to the provisioning engine 230. Thus, necessary billing information may then be sent to the billing system 250 in a notify billing message 236 so that billing for the subscriber is set up by creating the billing records in the billing system 250. The billing system sends a billing setup acknowledgement 252 to the provisioning engine 230. Thereafter, a provision acknowledgement 238 is sent to the order management system 220. A setup acknowledgement 226 is sent to the subscriber 210. Accordingly, within a couple of minutes, the subscriber's phone is capable of communicating with other devices. The subscriber 210 may begin provisioning at the store personally or with a customer agent's assistance. If only the core services have been provisioned, the subscriber 210 will not have non-core services such as voicemail, ring tones, etc. However, the subscriber 210 may use the phone and the service provider may begin the billing process.

In the background, the provisioning engine 230 may send the non-core network setup message 234 to the network elements 240. The network elements 240 sends a non-core network status return message 244 to the provisioning engine 230 once any required network elements to support the non-core services has been set up. Once the non-core services are set up, the billing system 250 may be notified 236 and the subscriber 210 may be billed for such services.

Thus, as shown in FIG. 2, the provisioning is accomplished through a series of synchronous calls that manage a subset of asynchronous calls through the provisioning system 230, thereby allowing a subscriber 210 to be considered 'active' and 'billable' upon the successful completion of the core services. Other elements being requested for activation, such as voicemail, messaging and content, can continue through the provisioning process in the background while the customer is able to make use of voice and data.

For a failed provision, a customer service agent may query follow-up management queues 260. When a subscriber signs up for a plan and services package, the back-end product catalog grading system 262 stored in the order management system 220 has the knowledge of everything that this customer has ordered. Thus, for non-core or trivial services, the service provider does not want to be prevented from billing the subscriber 210 or to prevent the subscriber from making calls and then being billed. The goal is to reduce the number of failure points.

Accordingly, the system 200 shown in FIG. 2 breaks the connection between provisioning core or non-core issues to solve the problem of having to provision all services successfully before the subscriber 210 can use the wireless device and the service provider can begin billing. Moreover, what is determined to be core or non-core services may be defined before a device is released. Also, this division may be changed on the fly by simply changing the catalog. Accordingly, fallout management for failed provisioning of non-core services occurs at a lower level of priority.

Figure 3:
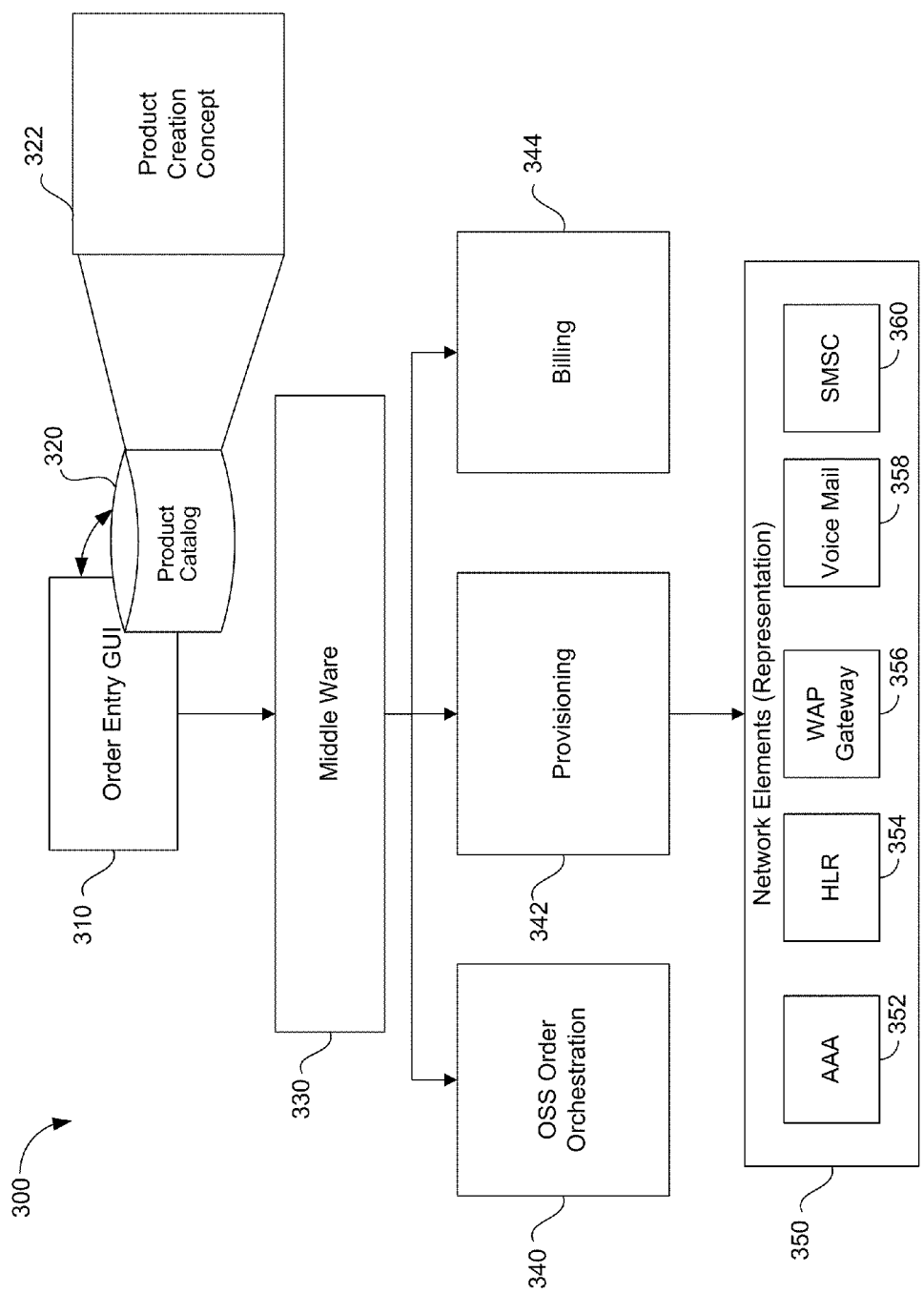
FIG. 3 is a block diagram of a system for asynchronously provisioning core and non-core services according to an embodiment of the invention.

FIG. 3 is a block diagram 300 of a system for asynchronously provisioning core and non-core services according to an embodiment of the invention. In FIG. 3, an order entry interface 310 (e.g., a graphical user interface (GUI)) is provided. The order entry interface 310 has access to a product catalog 320. The product catalog 320 is defined using a product creation concept 322. The order entry interface 310 is coupled to middleware 330, which provides control and access to OSS order orchestration 340, provisioning 342 and billing 344. The provisioning element 342 may access network elements 350 to request provisioning for a subscriber. The network elements may, for example, include authentication, authorization, and accounting (AAA) 352, a home location register (HLR) 354, a wireless access protocol (WAP) gateway 356, voicemail 358 and short message service center (SMSC) 360. Those skilled in the art will recognize that other or additional network elements may be included.

Figure 4:
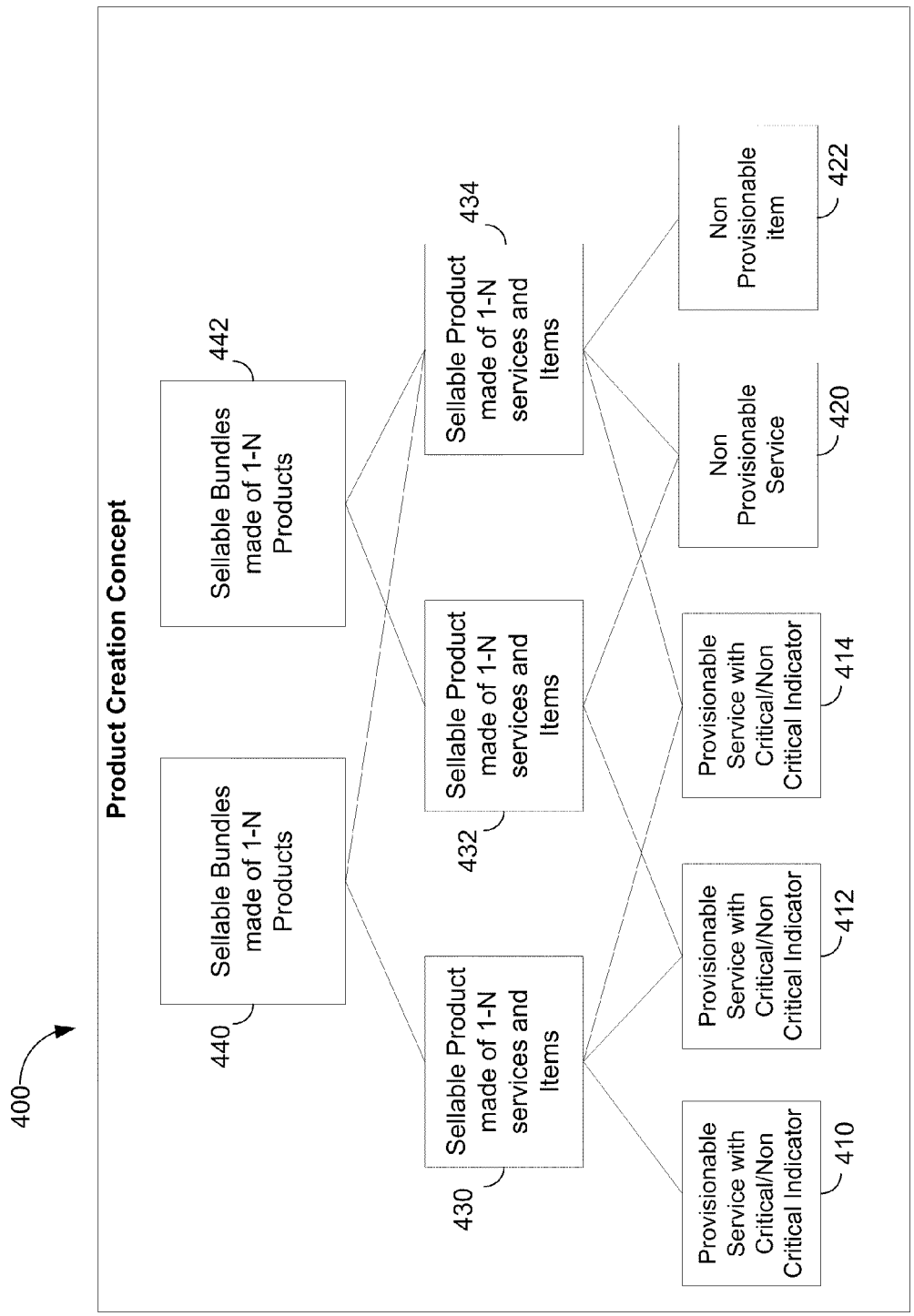
FIG. 4 is a diagram showing the product creation concept according to an embodiment of the invention.

FIG. 4 is a diagram showing the product creation concept 400 according to an embodiment of the invention. At the first level, provisionable services 410, 412, 414 and non-provisionable services/items 420, 422 are shown. The provisional services include indicators for designating whether the provisional services are critical or non-critical (core/non-core). A sellable product may be defined to include 1-N services and items. For example, the first sellable product 430 only includes provisionable services 410, 412, 414. The second sellable product 432 includes both provisionable 412 and non-provisionable services 420. The third sellable product includes both provisionable services 414 and non-provisionable service 420 as well as non-provisionable item 422. Finally, sellable bundles 440, 442 are defined using the sellable products 430, 432, 434 at the second level.

Figure 5:
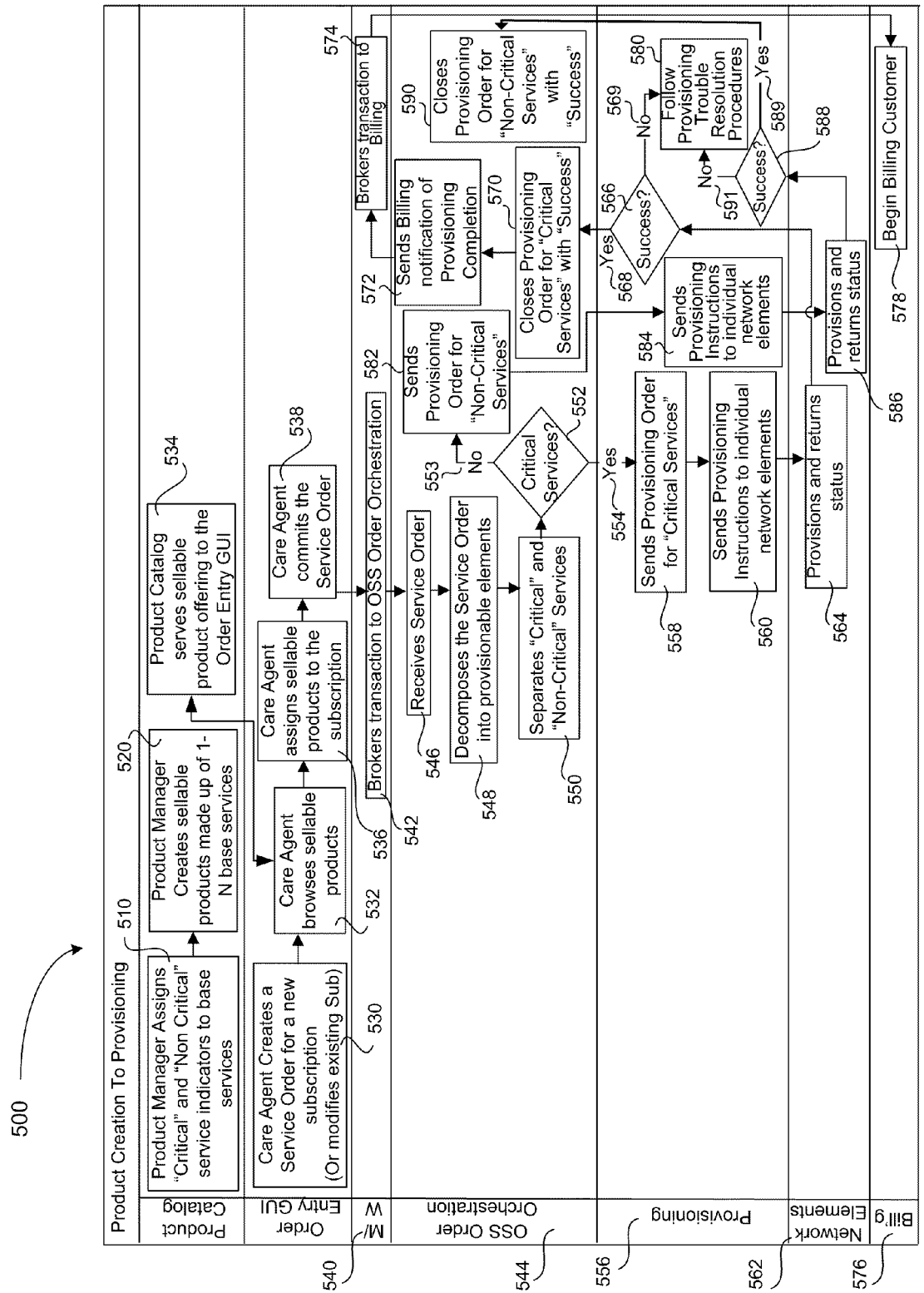
FIG. 5 is a diagram showing the flow and functions of asynchronous provisioning according to an embodiment of the invention.

FIG. 5 is a diagram showing the flow and functions of asynchronous provisioning 500 according to an embodiment of the invention. In FIG. 5, the product manager assigns "critical" and "non critical" service indicators to base services 510. The product manager then creates sellable products made up of 1-N base services 520. A care agent creates a service order for a new subscription or modifies existing subscription 530. A care agent browses sellable products 532. The product catalog serves sellable product offering to the order entry GUI 534. The care agent assigns sellable products to the subscription 536 and commits the service order 538. Middleware 540 brokers the transaction to OSS order orchestration 542. The OSS order orchestration 544 receives the service order 546 and decomposes the service order into provisionable elements 548. The OSS order orchestration 544 separates "critical" and "non-critical" services 550. A determination is made whether critical services or non-critical services are being provisioned 552. If critical services 554, the provisioning engine 556 sends a provisioning order for "critical services" 558 and then sends provisioning instructions to individual network elements 560. The network elements 562 implement the appropriate provisions and return a status 564 to the provisioning engine 556. A determination is made whether the provisioning was a success 566. If the provisioning is a success 568, the provisioning order for "critical services" is closed with "success" status 570 by the OSS order orchestration 544 and sends billing notification of provisioning completion 572 to the middleware 540, which brokers the transaction with the billing system 574. The billing system 576 may then begin billing the customer 578. If the provisioning was not a success 569, provisioning trouble resolution procedures are followed to resolve the problem with provisioning 580.

If the request applies to a non-critical service 553, the OSS order orchestration 544 sends a provisioning order for "non-critical services" 582 to the provisioning engine 556. Provisioning engine 556 sends instructions to individual network elements 562. The network elements 562 implement the appropriate provisions and return a status message 586 to the provisioning engine 556. A determination is made regarding the success of the provisioning of the non-core services/items 588. If the provisioning is a success 589, the provisioning order for "non-critical services" is closed with "success" status 590. If not 591, provisioning trouble resolution procedures are followed to resolve the problem with provisioning 580.

Figure 6:
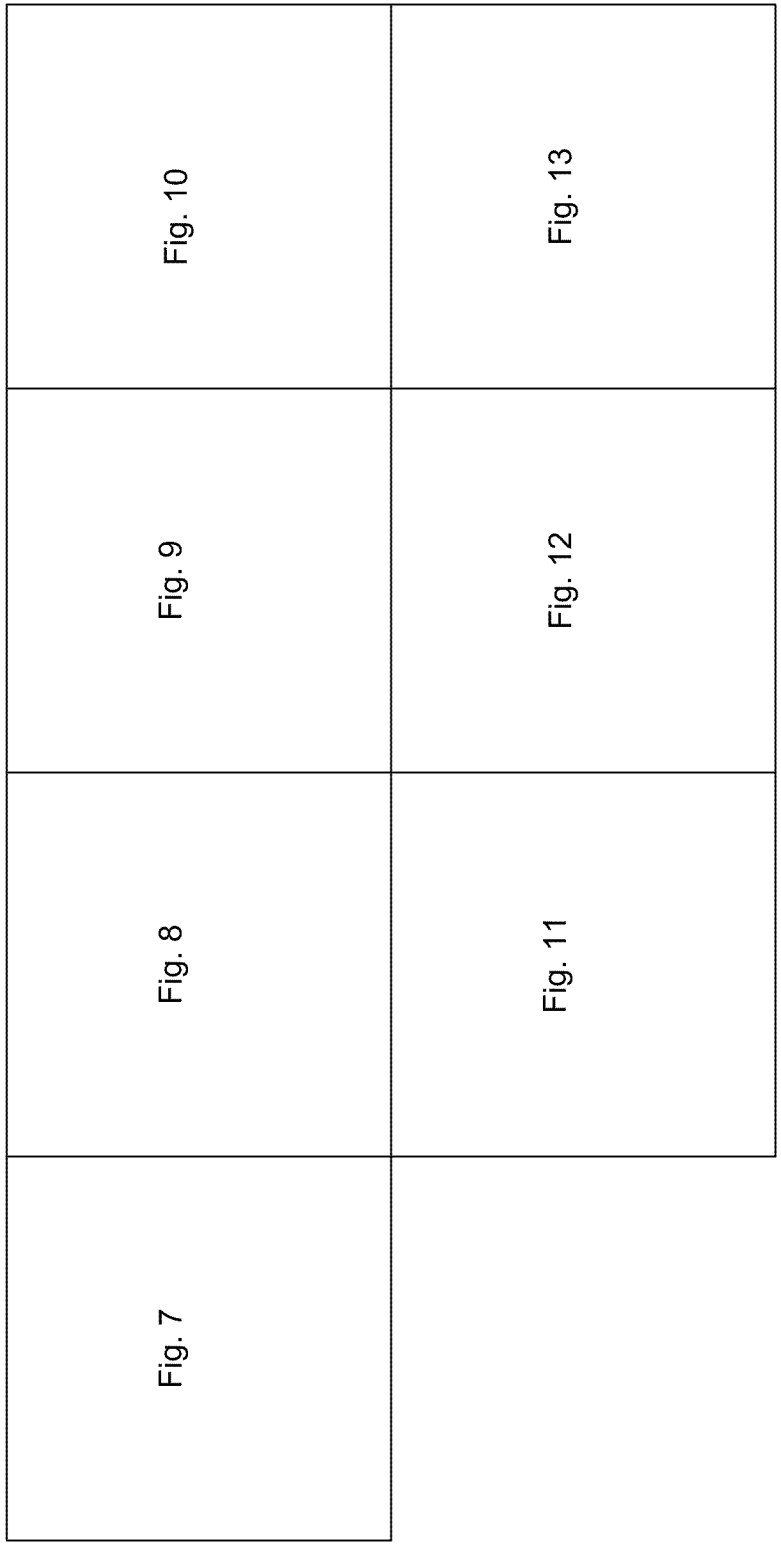
FIG. 6 is a layout diagram applicable to FIGS. 7-13.

FIG. 6 is a layout diagram applicable to FIGS. 7-13. FIGS. 7-13 are detailed flow diagrams of customer activation according to an embodiment of the invention.

Figure 7:
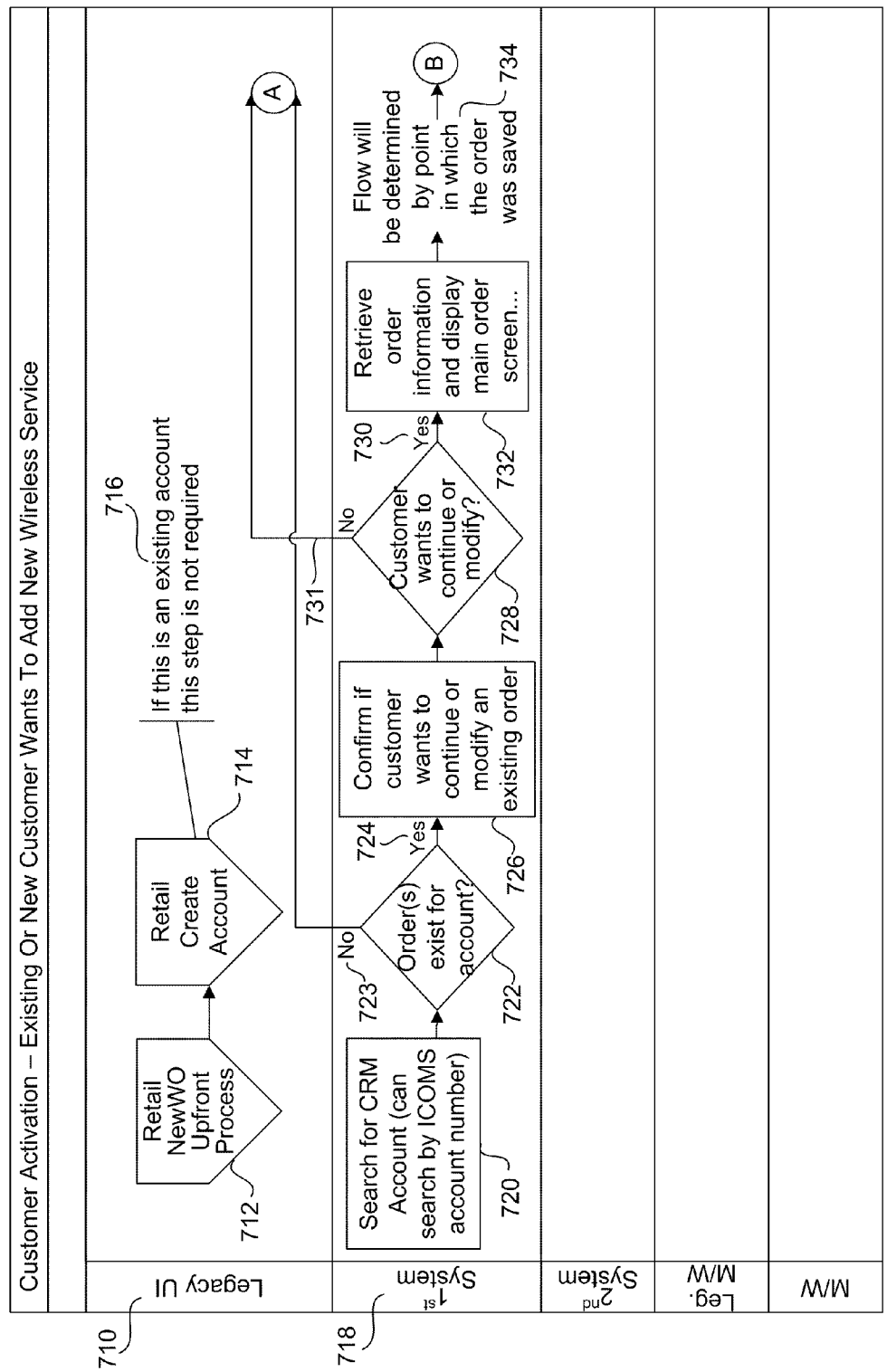
FIGS. 7-13 are detailed flow diagrams of customer activation according to an embodiment of the invention.

In FIG. 7, the legacy user interface 710 is used to implement the retail New Work Order upfront process 712 and to create a retail account 714. If the subscriber already has an account, the legacy user interface is not used 716.

A first system 718 is used to search for a CRM account 720. A search by ICOMS account number may be used. A determination is made whether an order exist for the account 722. If yes 724, confirmation that the customer wants to continue or modify an existing order is made 726. Then, a determination of whether the customer wants to continue or modify is made 728. If yes 730, order information is retrieved and displayed on the main order screen 732. In this process, flow will be determined by the point that the order was saved 734.

Figure 8:
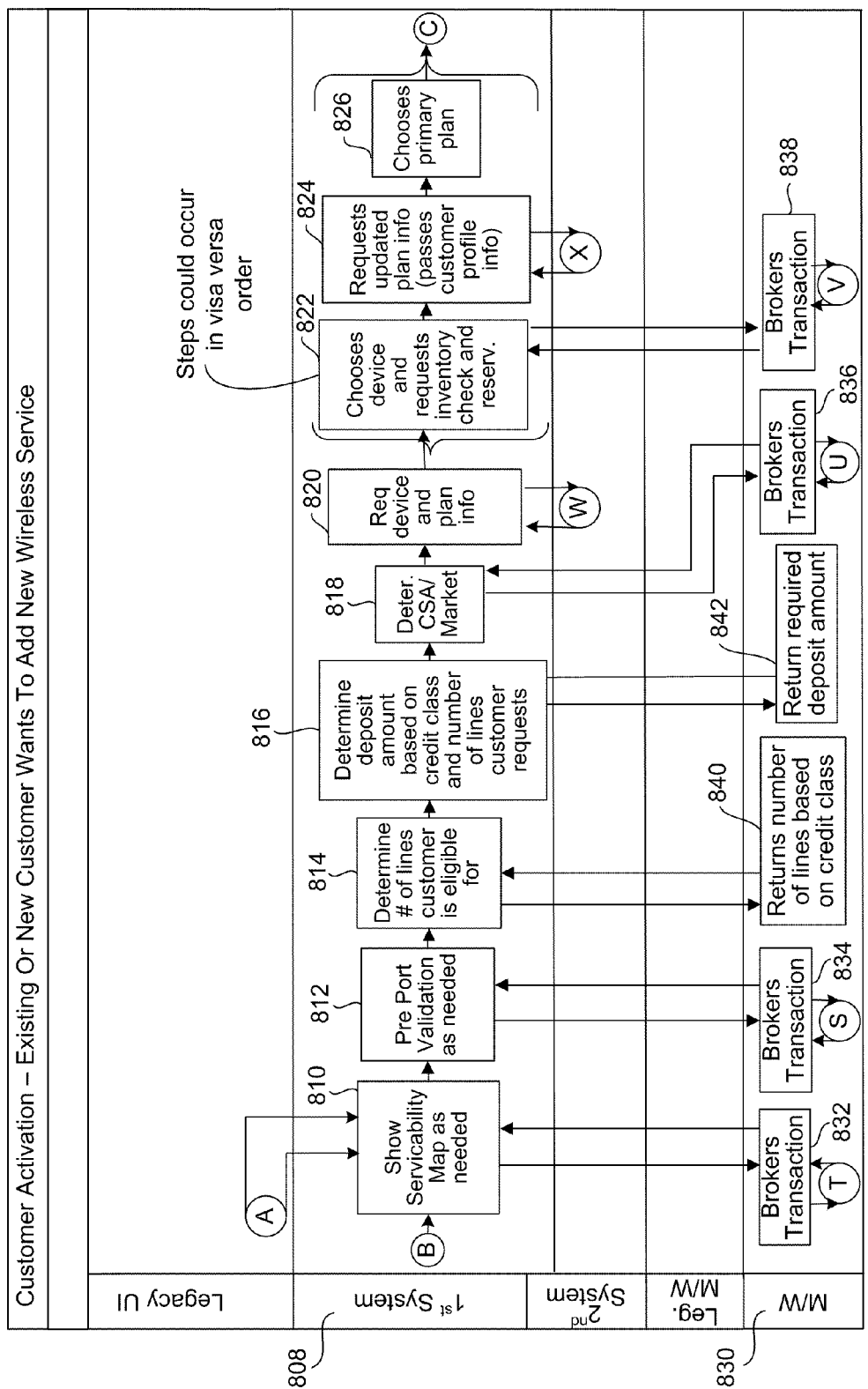

In FIG. 8, if an order does not exist 723, or if the customer does not want to continue or modify the order 731 (from FIG. 7 at "A"), the serviceability map 810 is shown as needed by the first system 808. The serviceability map is also displayed as needed when the order information is retrieved and displayed 732 (from FIG. 7 at "B"). If needed, pre port validation may be performed 812. Next, the number of lines the customer is eligible for is determined 814. The deposit amount is determined based on credit class and number of lines the customer requests 816. The CSA/market is determined 818. The device and plan information is requested 820. The device is chosen and inventory check and reservation is requested 822. Updated plan information, which passes the customer profile information, is requested 824. The primary plan may then be chosen 826. For 810-814 and 818-820, the middleware 830 brokers the transaction 832, 834, 836, 838. The middleware 830 also returns the number of lines based on the credit class of the subscriber 840 and returns the amount needed for the required deposit 842. Those skilled in the art will recognize that the 822-826 may be performed in visa versa order. Moreover, the order process shown herein may be designed with a shopping cart approach. The process continues from "C" in FIG. 9.

Figure 9:
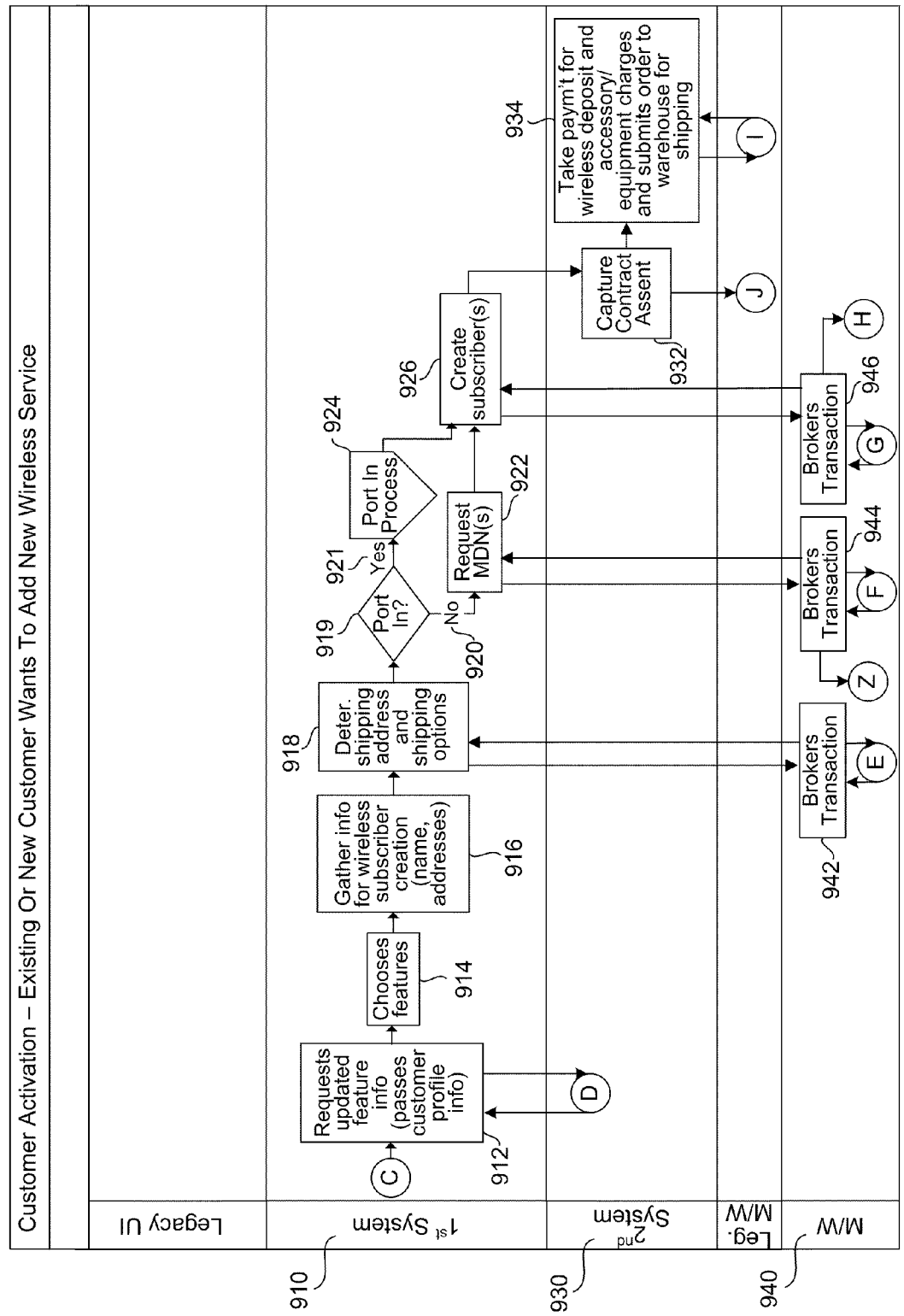

In FIG. 9, the first system 910 requests updated feature information, which passes customer profile information 912. The features are then chosen 914. Information for wireless subscriber creation (e.g., name, addresses, etc.) is obtained 916. The shipping address and shipping options are determined 918. A determination is made whether the subscriber is to port the wireless number 919. If not 920, a mobile directory number (MDN) is requested 922. If yes 921, the porting of the number is processed 924. Thereafter, a subscriber account is created 926. A second system 930 is used to capture assent from the potential subscriber 932. The payment for wireless deposit and accessory/equipment charges is made and the order is submitted to warehouse for shipping 934. The middleware 940 brokers the transaction for determining the shipping address and shipping options 942, the request for the brokers transaction mobile directory number (MDN) 944, and the creation of the subscriber account 946.

Figure 10:
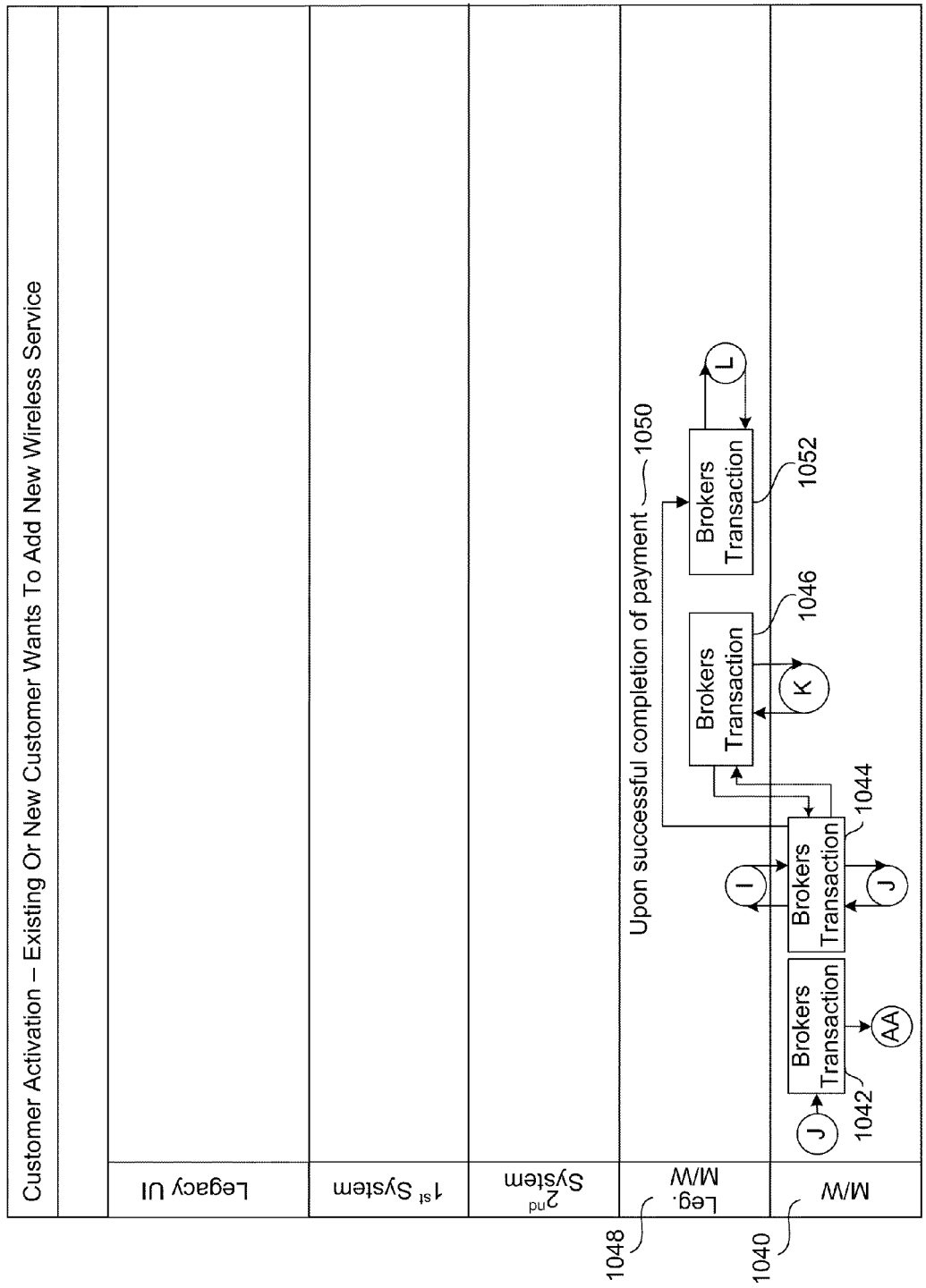

FIG. 10 shows that the middleware 1040 brokers the contract assent transaction from "J" 1042 as well as the taking of the payment for the deposit and accessory/equipment charges from "I" 1044. As will be discussed below with reference to FIG. 13, legacy middleware 1048 brokers the transaction for post payment for wireless portion of the deposit 1046. Upon successful completion of payment 1050, control is relinquished to legacy middleware 1048 for transaction brokering 1052.

Figure 11:
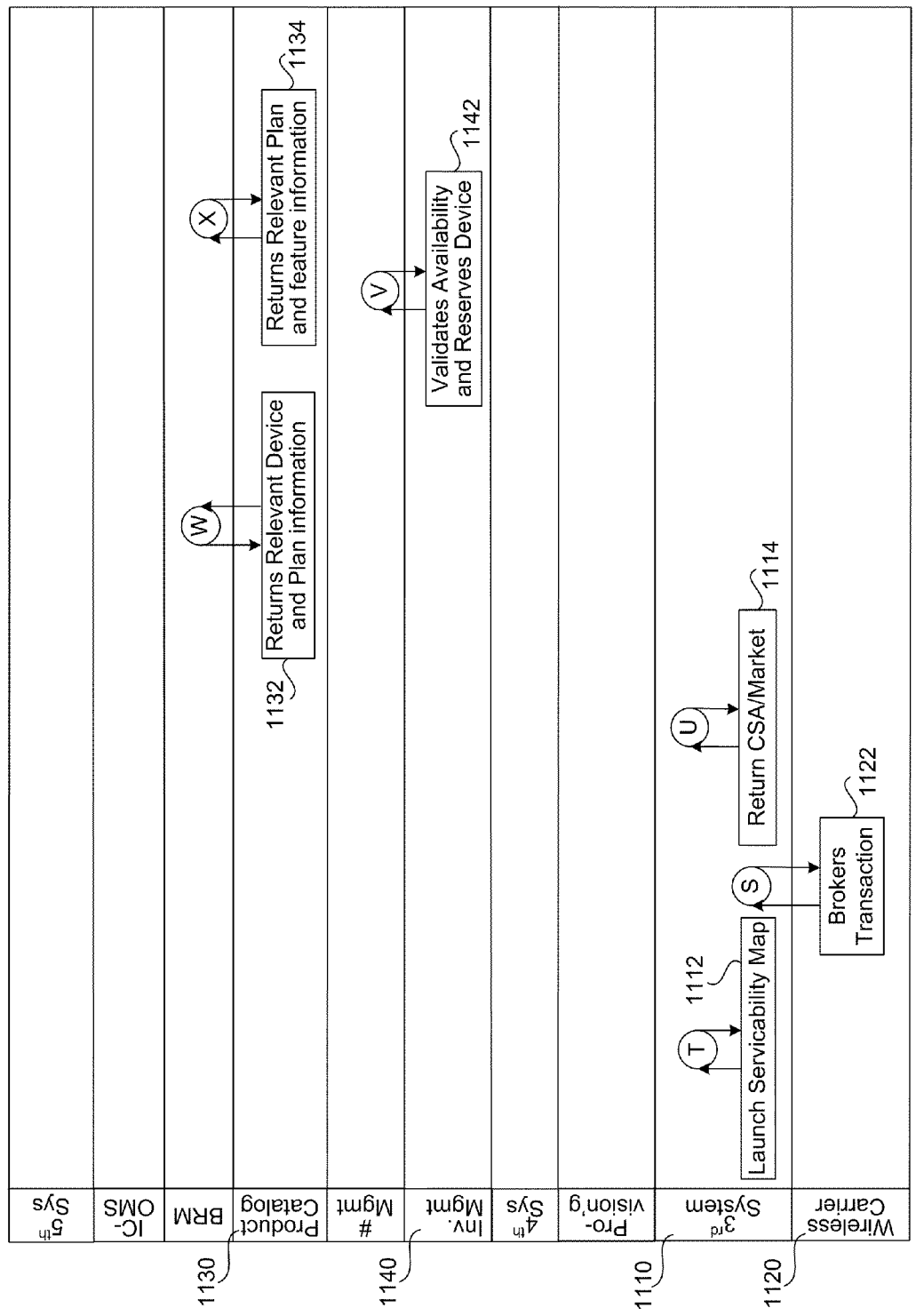

Turning to FIG. 11, a third system 1110 launches the serviceability map 1112 and returns to the primary middleware at "T" before being returned to the middleware 830 as shown in FIG. 8. A wireless carrier 1120 brokers the transaction associated with pre-port validation 1122 with flow returned at "S" to the middleware interposed between the wireless carrier 1120 and the first system as shown in FIG. 8. The third system 1110 returns CSA/market information 1114 at "U" to the middleware 830 as shown in FIG. 8. The system maintaining the product catalog 1130 returns, at "W", the relevant device and plan information to the first system 808 as shown in FIG. 8 and returns, at "X", the relevant plan information and feature information 1134 to the first system 808 as shown in FIG. 8. Inventory management 1140 validates availability, reserves the device 1142, and provides feedback at "V" to the middleware 830 as shown in FIG. 8.

Figure 12:
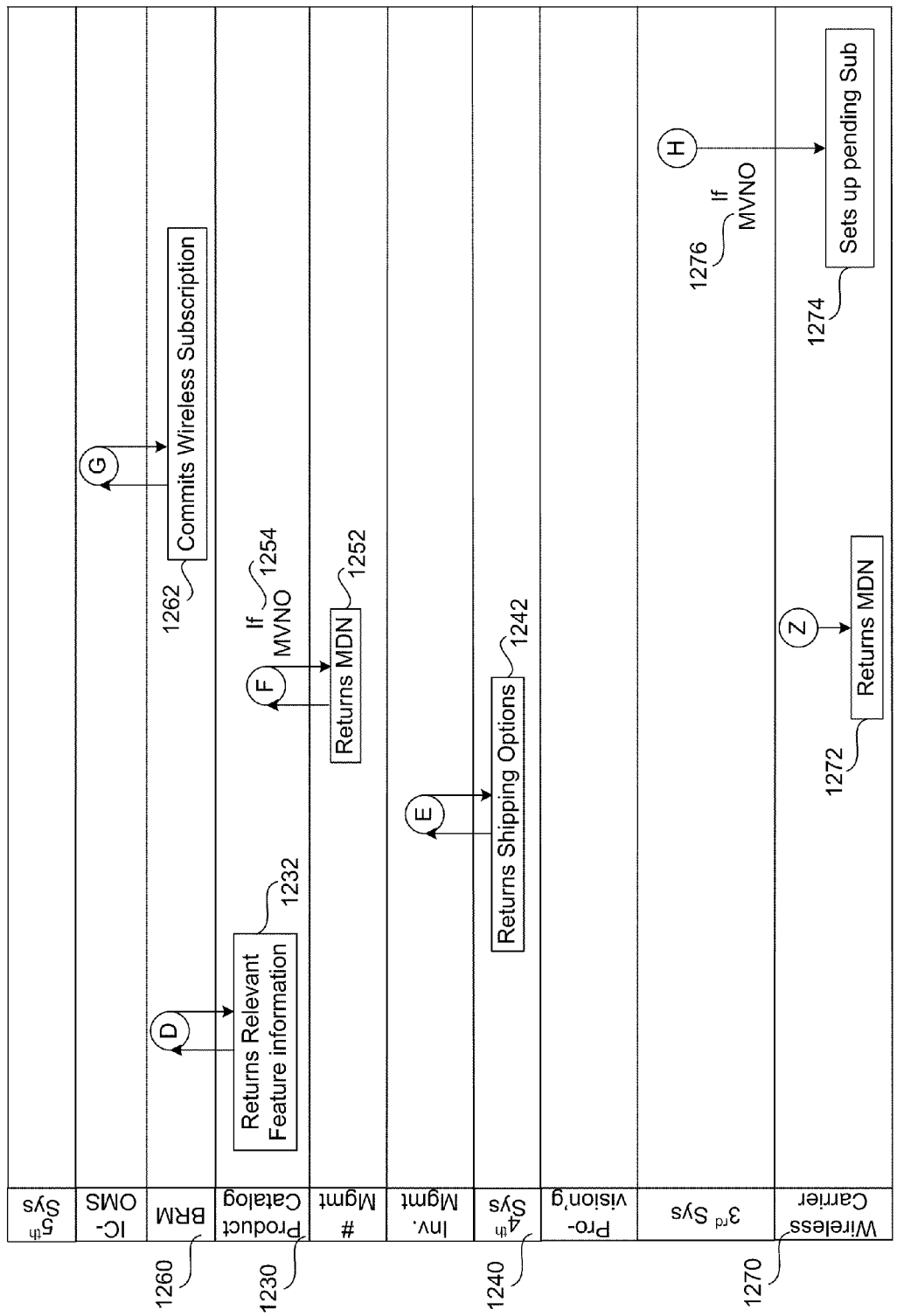

In FIG. 12, the product catalog 1230 returns the relevant feature information 1232 at "D" to the first system 910 as shown in FIG. 9. A fourth system 1240 returns the shipping options 1242 at "E" to the middleware 940 as shown in FIG. 9. A number management system 1250 returns the mobile directory number (MDN) 1252 to the middleware 940 as shown in FIG. 9 if the carrier is a mobile virtual network operator (MVNO) 1254. A business resource management system 1260 commits the wireless subscription 1262 and provides acknowledgement at "G" to the middleware 940 as shown in FIG. 9. If not a MVNO, a wireless carrier 1270 returns the mobile directory number (MDN) 1272 at "Z" to the middleware 940 as shown in FIG. 9. Also, if the carrier is a MVNO 1276, the underlying wireless carrier 1270 prepares for the pending subscriber 1274.

Figure 13:
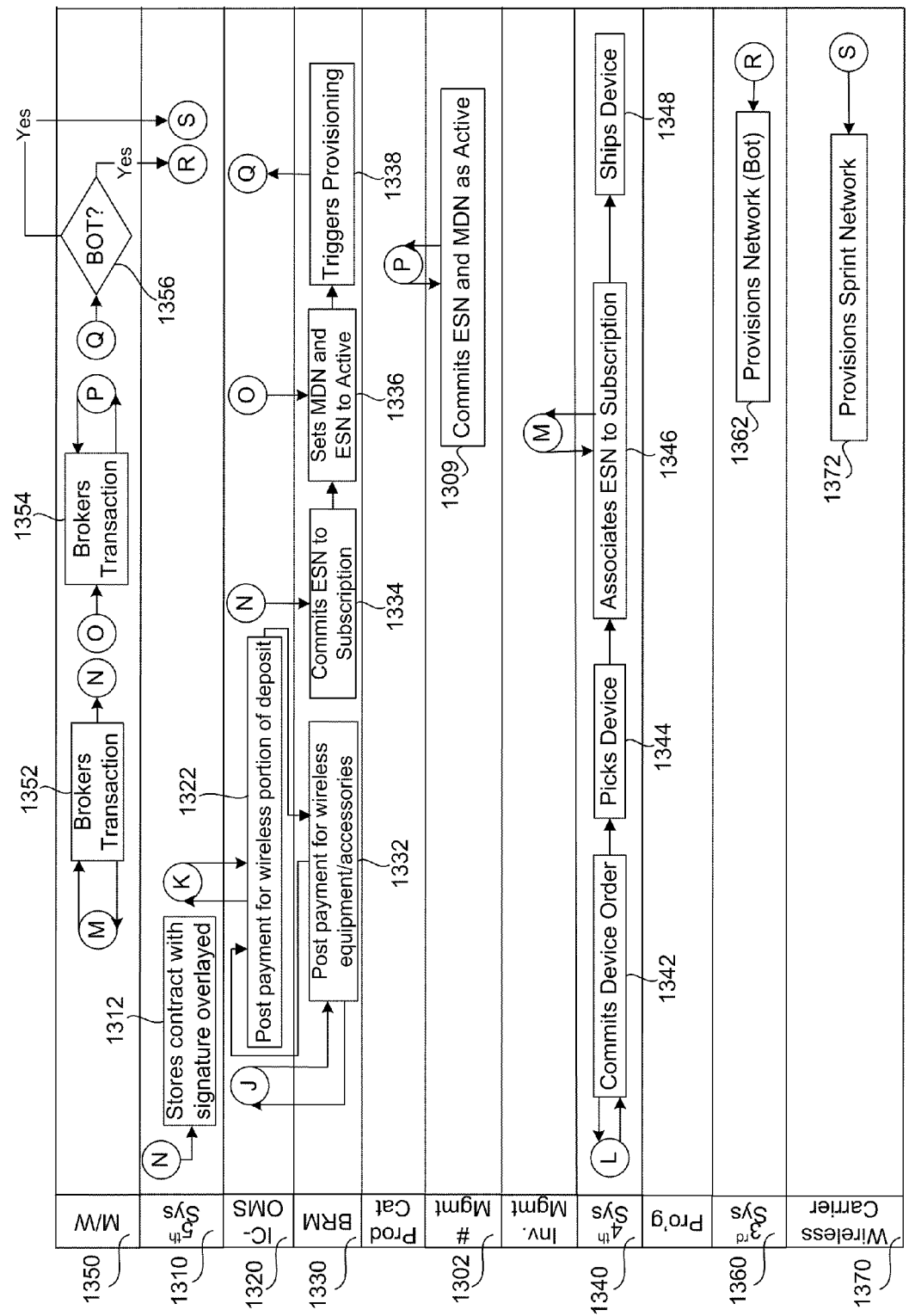

In FIG. 13, a fifth system 1310 stores the contract with a signature overlay 1312 once contact assent has been made at "N." An integrated communications operations management system (ICOMS) 1320 handles the post payment for wireless portion of the deposit 1322. Number management system 1302 commits the ESN and MDN as active 1309 as brokered by middleware 1350 at "P." The business resource management system 1330 handles the post payment for wireless equipment and accessories 1332. The business resource management system 1330 also commits the electronic serial number (ESN) to the subscription 1334 and sets the MDN and ESN to active 1336. The middleware 1350 brokers at "O" the setting of the MDN and ESN to active by the business resource management system 1330. Thereafter, the business resource management system 1330 triggers provisioning 1338 by signaling the middleware BOT 1356 at "Q." The fourth system 1340 commits the device order 1342 and picks the device 1344. Then, the fourth system 1340 associates the ESN to the subscription 1346. This information is provided, at "M" back to the middleware 1350, which brokers the transaction 1352 with the business resource management system 1330 at "N." Then, the device is shipped 1348. The third system 1360 provisions the network 1362 upon triggering by the middleware 1350 at "R." The middleware 1350 also triggers the provisioning 1372 handled by the carrier network 1370 at "S" for the subscriber.

Figure 14:
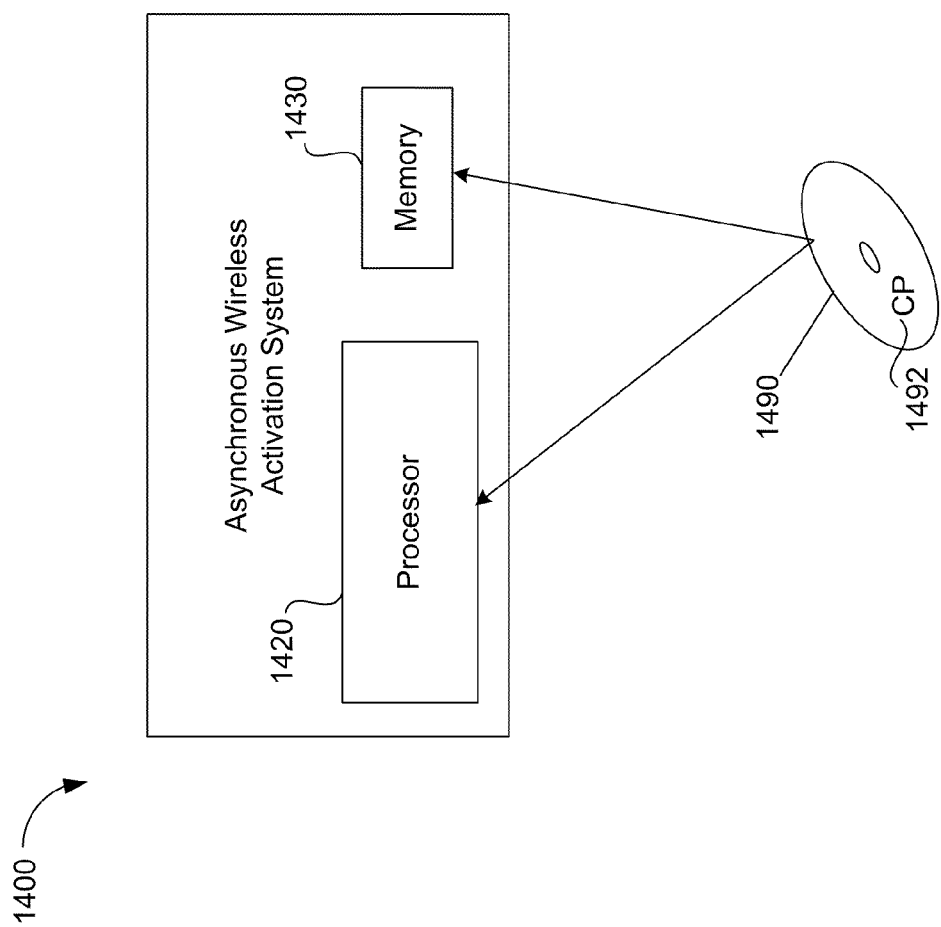
FIG. 14 illustrates a suitable computing environment for implementing a system for providing activation of wireless devices within a real time billing infrastructure according to an embodiment of the invention.

FIG. 14 illustrates a suitable computing environment 1400 for implementing a system for providing activation of wireless devices within a real time billing infrastructure according to an embodiment of the invention. In FIG. 14, an asynchronous activation system 1400 includes a processor 1420 and memory 1430. Embodiments may also be implemented in combination with other types of computer systems and program modules. Generally, program modules include routines, programs, components, data structures, and other types of structures that perform particular tasks or implement particular abstract data types. By way of example, computer readable media 1490 can include computer storage media and communication media. Computer storage media 1490 includes volatile and nonvolatile, removable and non-removable media implemented in any method or technology for storage of information 1492, such as computer readable instructions, data structures, program modules or other data. Computer storage media 1490 typically embodies computer readable instructions, data structures, and program modules. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 1490 may refer to a mass storage device, such as a hard disk or CD-ROM drive. However, it should be appreciated by those skilled in the art that computer-readable media can be any available media that can be accessed or utilized by a processing device, e.g., server or communications network provider infrastructure.

By way of example, and not limitation, computer-readable media 1490 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a processing device.

As mentioned briefly above, a number of program modules and data files may be stored and arranged for controlling the operation of processing devices. Thus, one or more processing devices 1420 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for asynchronously activating wireless services for a subscriber of a wireless device, comprising:
   decomposing services associated with an order for the wireless device of a wireless subscriber into core services and non-core services including analyzing services in the order for wireless services by the wireless device to identify each service in the order and comparing each service in the order to a product catalog to identify the core services that are critical for providing voice calling and the non-core services that are not critical for providing voice calling;
   providing separate provisioning jobs for asynchronously provisioning the core services and the non-core services to prevent failure of activation of the wireless device because of a failure of a non-core service to be provisioned; and
   upon successful completion of the provisioning of the core services and without regard to completion of the provisioning of the non-core services, establishing an account for the subscriber in a billing system to allow immediate use of the core services by the wireless subscriber and immediate billing for usage of the core services by the wireless subscriber.

2. The method of claim 1, wherein the product catalog is configurable to allow core and non-core designations for services to be modified.

3. The method of claim 1 further comprising allowing the core services to function with at least one non-core service not functioning.

4. The method of claim 1 further comprising allowing the core services to be billed without at least one non-core service working.

5. The method of claim 1 further comprising:
   identifying the non-core service that failed provisioning;
   trouble-shooting the failed provisioning of the non-core service to identify the cause of the failed provisioning of the non-core service;
   correcting the cause of the failed provisioning of the non-core service;
   re-provisioning the failed non-core service to provide successful provisioning of the non-core service; and
   updating the billing system to reflect successful provisioning of the non-core service.

6. A system for asynchronously activating wireless services for a subscriber of a wireless device, comprising:
   memory for storing data including a product catalog identifying services for wireless devices; and
   a processor, coupled to the memory, the processor configured to decompose services associated with an order for the wireless device of a wireless subscriber into core services and non-core services, including analyzing services in the order for wireless services by the wireless device to identify each service in the order and comparing each service in the order to a product catalog to identify the core services that are critical for providing voice calling and the non-core services that are not critical for providing voice calling, to generate separate provisioning jobs for asynchronously provisioning the core services and the non-core services to prevent failure of activation of the wireless device because of a failure of a non-core service to be provisioned and, upon successful completion of the provisioning of the core services and without regard to completion of the provisioning of the non-core services, to establish an account for the subscriber in a billing system to allow immediate use of the core services by the wireless subscriber and immediate billing for usage of the core services by the wireless subscriber.

7. The system of claim 6, wherein the product catalog stored in memory is configurable to allow core and non-core designations for services to be modified.

8. The system of claim 6, wherein the processor is further configured to allow the core services to function with at least one non-core service not functioning.

9. The system of claim 6, wherein the processor is further configured allow the core services to be billed without at least one non-core service working.

10. The system of claim 6, wherein the processor is further configured to identify the non-core service that failed provisioning, to trouble-shoot the failed provisioning of the non-core service to identify the cause of the failed provisioning of the non-core service, to correct the cause of the failed provisioning of the non-core service, to re-provision the failed non-core service to provide successful provisioning of the non-core service and to update the billing system to reflect successful provisioning of the non-core service.

11. A computer readable storage device including executable instructions which, when executed by a processor, provides asynchronously activation of wireless services for a subscriber of a wireless device, by:

decomposing services associated with an order for the wireless device of a wireless subscriber into core services and non-core services including analyzing services in the order for wireless services by the wireless device to identify each service in the order and comparing each service in the order to a product catalog to identify the core services that are critical for providing voice calling and the non-core services that are not critical for providing voice calling;

providing separate provisioning jobs for asynchronously provisioning the core services and the non-core services to prevent failure of activation of the wireless device because of a failure of a non-core service to be provisioned; and upon successful completion of the provisioning of the core services and without regard to completion of the provisioning of the non-core services, establishing an account for the subscriber in a billing system to allow immediate use of the core services by the wireless subscriber and immediate billing for usage of the core services by the wireless subscriber.

12. The computer readable storage device of claim 11, wherein the product catalog is configurable to allow core and non-core designations for services to be modified.

13. The computer readable storage device of claim 11 further comprising allowing the core services to function with at least one non-core service not functioning.

14. The computer readable storage device of claim 11 further comprising allowing the core services to be billed without at least one non-core service working.

15. The computer readable storage device of claim 11 further comprising:

identifying the non-core service that failed provisioning;

trouble-shooting the failed provisioning of the non-core service to identify the cause of the failed provisioning of the non-core service;

correcting the cause of the failed provisioning of the non-core service;

re-provisioning the failed non-core service to provide successful provisioning of the non-core service; and updating the billing system to reflect successful provisioning of the non-core service.

16. The method of claim 1, wherein the non-core services include voicemail service.

17. The method of claim 1, wherein the non-core services include services for ring tones.

18. The system of claim 6, wherein the non-core services include voicemail service.

19. The system of claim 6, wherein the non-core services include services for ring tones.

20. The computer readable storage device of claim 11, wherein the non-core services include voicemail service.

* * * * *